United States Patent [19]

Yamashita et al.

[11] Patent Number: 5,295,190
[45] Date of Patent: Mar. 15, 1994

[54] METHOD AND APPARATUS FOR SPEECH RECOGNITION USING BOTH LOW-ORDER AND HIGH-ORDER PARAMETER ANALYZATION

[75] Inventors: Yasuki Yamashita; Yoichi Takebayashi, both of Yokohama, Japan

[73] Assignee: Kabushiki Kaisha Toshiba, Kawasaki, Japan

[21] Appl. No.: 755,840

[22] Filed: Sep. 6, 1991

[30] Foreign Application Priority Data

Sep. 7, 1990 [JP] Japan .................................. 2-235697

[51] Int. Cl.$^5$ ................................................ G10L 5/06
[52] U.S. Cl. .......................................... 381/43; 381/41
[58] Field of Search ........................ 381/41, 43; 395/2

[56] References Cited

U.S. PATENT DOCUMENTS

| | | | |
|---|---|---|---|
| 4,158,750 | 6/1979 | Sakoe et al. ............................ | 381/43 |
| 4,624,010 | 11/1986 | Takebayashi ........................ | 381/43 |
| 4,624,011 | 11/1986 | Watanabe et al. .................... | 381/43 |
| 4,677,673 | 6/1987 | Ukita et al. ............................ | 381/43 |
| 4,736,429 | 4/1988 | Niyada et al. ......................... | 381/43 |
| 4,783,802 | 11/1988 | Takebayashi et al. ................ | 381/41 |
| 4,937,869 | 6/1990 | Iwahashi et al. ..................... | 381/43 |
| 4,955,056 | 9/1990 | Stentiford ............................. | 381/43 |
| 5,003,601 | 3/1991 | Watari et al. ......................... | 381/43 |
| 5,027,404 | 6/1991 | Taguchi ................................ | 381/36 |
| 5,056,143 | 10/1991 | Taguchi ................................ | 381/35 |

FOREIGN PATENT DOCUMENTS 2225142 5/1990 United Kingdom .

OTHER PUBLICATIONS

International Conference on Acoustics Speech and Signal Processing, vol. 2, Apr. 14, 1983, pp. 719–722, E. Bronson, "Syntactic Pattern Recognition of Discrete Utterances".

AT&T Bell Laboratories Technical Journal, vol. 63, No. 3, Mar. 1, 1984, pp. 479–498, J. Wilpon, et al., "An Improved Word-Detection Algorithm for Telephone-Quality Speech Incorporating Both Syntactic and Semantic Constraints".

Bell System Technical Journal, vol. 54, No. 2, Feb. 1, 1975, pp. 297–315, L. R. Rabiner, et al., "An Algorithm for Determining the Endpoints of Isolated Utterances".

Proceedings of the 7th IICPR 1984, pp. 1232–1235, Y. Takebayashi, et al., "Telephone Speech Recognition Using a Hybrid Method".

Y. Takebayashi, H. Shinoda, H. Asada, T. Nitta, S. Hirai and S. Watanabe: "Telephone Speech Recognition Using a Hybrid Method", Proc. Seventh IJCPR, pp. 1232–1235, 1984.

Primary Examiner—Arthur G. Evans
Assistant Examiner—Kee M. Tung
Attorney, Agent, or Firm—Oblon, Spivak, McClelland, Maier & Neustadt

[57] ABSTRACT

A speech recognition apparatus includes a a low-order parameter analyzation section for deriving low-order parameter time series of an input speech, a start and end point detection section for detecting the start and end points of the input speech by use of the parameter time series derived by the low-order parameter analyzation section, a high-order parameter analyzation section for deriving high order parameters at preset sampling points from the input speech of a range corresponding to the start and end points detected by the start and end point detection section, a pattern matching section for matching feature parameters corresponding to the parameters derived by the high-order parameter analyzation section with standard parameters previously registered and deriving similarities between the matched parameters, and a recognition result outputting section for outputting the recognition result for the input speech according to the similarities derived by the pattern matching section.

23 Claims, 8 Drawing Sheets

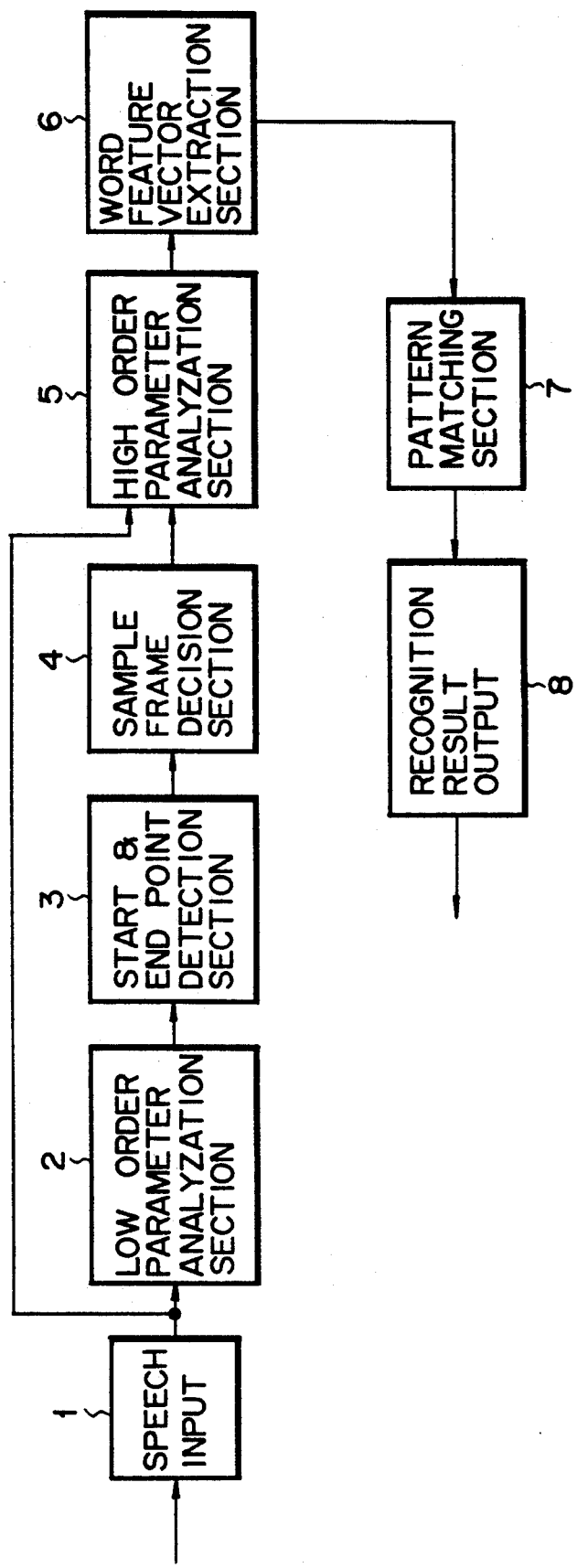
F I G. 1

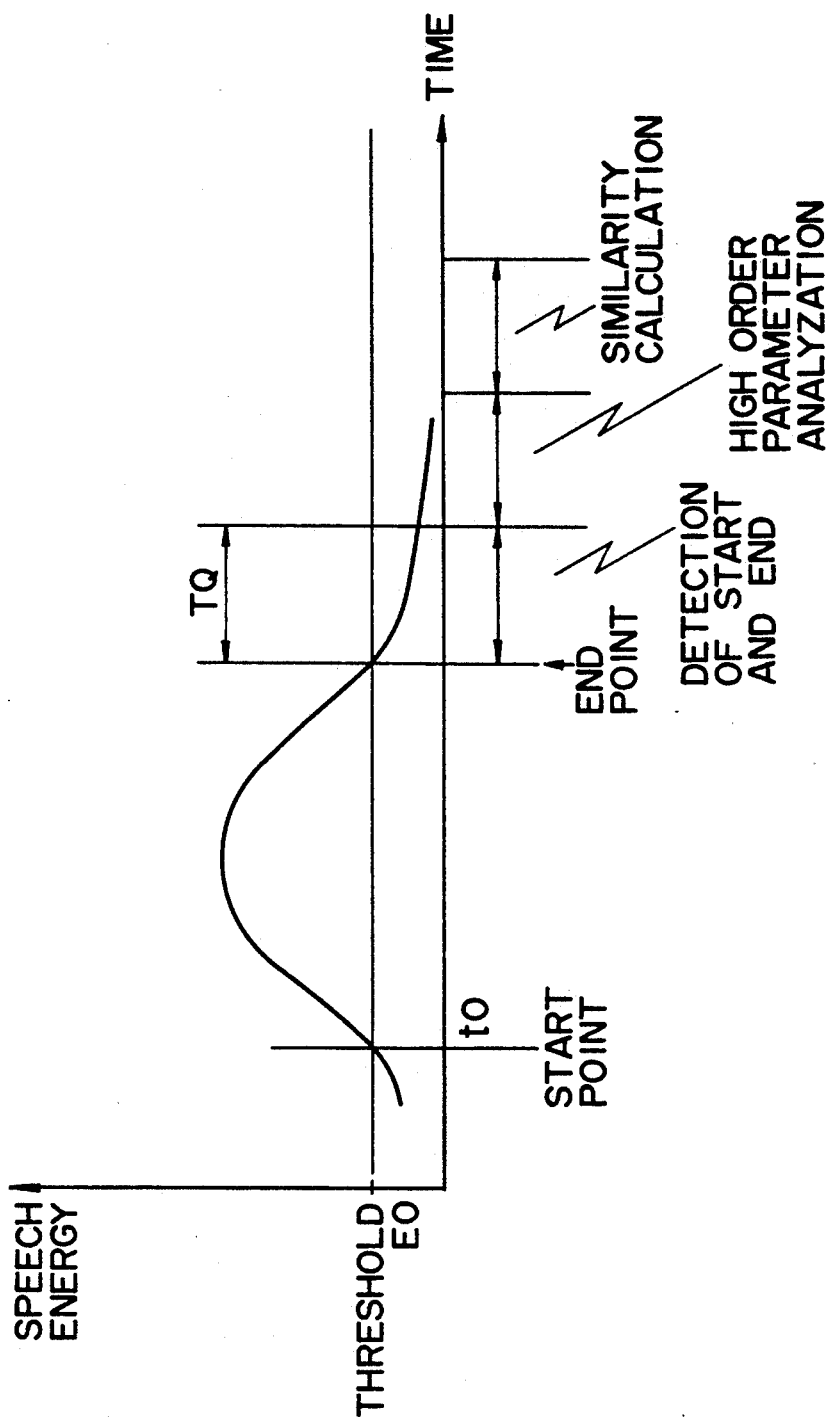
F I G. 4

METHOD AND APPARATUS FOR SPEECH RECOGNITION USING BOTH LOW-ORDER AND HIGH-ORDER PARAMETER ANALYZATION

BACKGROUND OF THE INVENTION

1. Field of the Invention

This invention relates to a speech recognition apparatus for extracting parameters from an input speech to recognize the speech.

2. Description of the Related Art

In the general speech recognition method, a method of recognizing the speech by extracting low order parameters or energy components and high order parameters or frequency components from the input speech and correctly recognizing the speech by use of both of the extracted parameters is dominant. This method is to simultaneously effect the low-order parameter analyzation and high-order parameter analyzation for the input speech on the real time basis. However, since it is necessary to analyze the DFT spectrum, filter bank, LPC parameters or the like at every 8 milliseconds on the real time basis in the high-order parameter analyzation, a specially high-speed signal processing hardware such as a DSP (digital signal processor) is required.

For example, according to the conventional acoustic recognition system disclosed in Acoustic Institution, March, 1982, "RECOGNITION OF TELEPHONE SPEECH BY HYBRID STRUCTURE MATCHING METHOD" ASADA et al., the low-order parameter analyzation and high-order parameter analyzation are first effected in parallel for the input speech (output of a speech input section). Then, the start and end points of word boundaries of the input speech are detected according to the result of the low-order parameter analyzation and sampling frame is determined according to a predetermined number of frames based on a range of the input speech corresponding to the detected start and end points. After this, speech feature spectrum of fixed orders is extracted from the result of high-order parameter analyzation (which is previously derived) corresponding to the range of the input speech according to the sample frame number and matched with standard patterns registered in a word dictionary and similarities therebetween are derived. The result of recognition is output according to the similarities.

In the above conventional speech recognition method, the high-order parameter analyzation for all of the input speech is first effected and then word feature spectrum is extracted by use of only the necessary high order parameters determined according to the high-order parameter analyzation. That is, since only several frames included in the result of the high-order parameter analyzation for the entire input speech are used, a large portion of the specially calculated high order parameters will become useless. In other words, calculations unnecessary for the speech recognition have been effected.

As described above, in the conventional speech recognition method, a special hardware for effecting the high-order parameter analyzation for the entire input speech is necessary and a large portion of specially calculated high order parameters becomes useless.

SUMMARY OF THE INVENTION

An object of this invention is to provide a speech recognition apparatus in which the high order-parameter analyzation only for necessary frames of an input speech is effected and therefore no special hardware is necessary.

According to this invention, the above object can be attained by a speech recognition apparatus comprising a low-order parameter analyzation section for deriving low-order parameter time series of an input speech; a start and end point detection section for detecting the start and end points of the input speech by use of the parameter time series derived by the low-order parameter analyzation section; a high-order parameter analyzation section for deriving high order parameters at preset sampling points from a range of the input speech corresponding to the start and end points detected by the start and end point detection section; a pattern matching section for matching feature parameters corresponding to the parameters derived by the high-order parameter analyzation section with standard parameters previously registered and deriving similarities between the matched parameters; and a recognition result outputting section for outputting the recognition result for the input speech according to the similarities derived by the pattern matching section.

In this invention, since all of the high order parameters are not derived on the real time basis, a special hardware for effecting the high-order parameter analyzation such as DSP at a high speed is not necessary. Therefore, the speech recognition can be effected by use of the calculation ability of a small-capacity computer such as a personal computer.

Further, even when a work station having a high calculation ability, for example, is used and the real-time processing of the high order parameters can be effected only by use of the software and if a system in which a multitask process is effected and another task is also effected simultaneously is used, the operation efficiency for the other task can be enhanced because useless high-order parameter calculations become unnecessary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a speech recognition apparatus according to one embodiment of this invention;

FIG. 4 is a diagram for illustration of detection of start and end points of word boundaries;

DETAILED DESCRIPTION OF THE PREFERRED EMBODIMENTS

In a speech recognition apparatus according to an embodiment of this invention shown in FIG. 1, a speech input section 1 converts an input speech signal input via a microphone or the like into a digital signal. The speech input section 1 includes a low-pass filter having a cut-off frequency of 5.6 kHz for removing high frequency noise components contained in the input speech signal and an A/D converter for converting an input signal (analog signal) received via the low-pass filter into a digital signal by use of a sampling frequency of 12 kHz, for example, and a quantization bit number of 12 bits.

A low-order parameter analyzation section 2 derives low order parameters for reducing the number of operations to derive energy and zero crossing number and deriving speech data in each analysis frame period of 8 milliseconds by use of the analysis window length of 24 milliseconds, for example. The thus derived low order parameters are used to detect the start and end points of word boundaries by means of a start and end point detection section 3.

Figure 2:
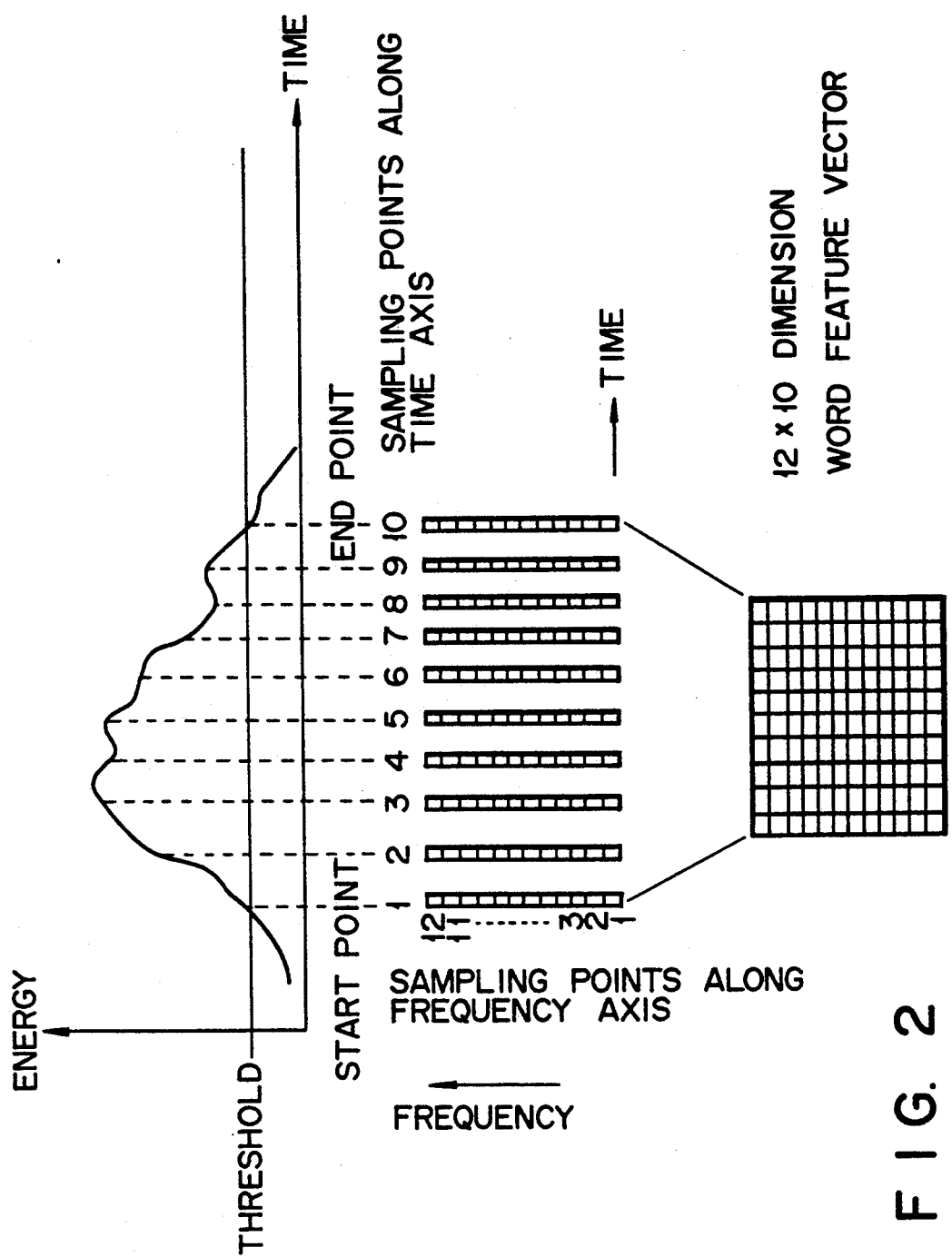
FIG. 2 is a diagram for illustration of examples of detection of start and end points and extraction of speech feature spectrum according to this invention.

The start and end point detection section 3 sets a threshold value for energy which is a low order parameter as shown in FIG. 2, and determines a point at which energy of the analysis frame has exceeded the threshold value as the start point of the word and a point at which energy of the analysis frame becomes smaller than the threshold value as the end point. The start and end points of word boundaries can be detected in the same manner by using the zero crossing number instead of the energy as the low order parameter. As a method of detecting the start and end points of a speech, various methods have been proposed and, for example, a start and end point detection method disclosed in an article by Y. Takabayashi, H. Shinaoda, H. Asada, T. Hitta, S. Hirai and S. Watanabe, "Telephone speech recognition using a hybrid method", Proc. Seventh IICPR, pp1232–1235, 1984 may be used.

A sample frame determination section 4 determines a sample frame or a frame for effecting the high-order parameter analyzation according to the detected start and end points. For example, the sample frame determination section 4 selects 10 frames, for example, at equal intervals from the frames to be analyzed between the start and end points detected as shown in FIG. 2. However, the number of frames is previously determined. Of course the sample frames may be determined at unequal intervals according to data instead of equal intervals. In this case, if 10 frames are necessary, actual frame numbers of the respective frames are derived.

A high-order parameter analyzation section 5 derives high order parameters such as filter analysis output, DFT spectrum, cepstrum or LPC parameter which require a large number of operations from those components of a speech signal from the speech input section 1 which correspond to only the sample frames determined a described above.

A speech feature spectrum extracting section 6 derives word feature parameters based on the derived high order parameters. For example, when high order parameters of 12 orders are used, word feature spectrum of $12 \times 10 = 120$ orders is derived as follows.

In a case where the speech feature spectrum is derived by use of FFT (fast Fourier transform), a frequency spectrum (DFT spectrum) $X_k$ having the resolution of the 256 points is obtained by performing the FFT of 256 points over a time length of 24 msec. The power $|X_k|^2$ of the frequency spectrum $X_k$ is smoothed in the frequency direction, divided into 12 portions in the frequency direction to derive a filter bank corresponding output $Z_i$ ($i = 1, 2, \ldots, 12$) of 12 channels (orders). More specifically, in a case where a filter bank corresponding output $Z_i$ ($i = 1, 2, \ldots, 12$) of 12 channels is derived, the frequency spectrum is smoothed in the frequency direction as follows.

$$Z_1 = \sum_{k=5}^{9} |X_k|^2$$

$$Z_2 = \sum_{k=5}^{14} |X_k|^2$$

$$Z_i = \sum_{k=mi}^{ni} |X_k|^2$$

$$Z_{12} = \sum_{k=70}^{110} |X_k|^2$$

By taking the logarithm of the filter bank corresponding output $Z_i$ ($i = 1, 2, \ldots, 12$) thus obtained, the high order parameter of 12 orders can be obtained as follows.

$$G_i = 10 \log Z_i \ (i = 1, 2, \ldots, 12)$$

Further, the same method as described above can be effected when the word feature spectrum is derived by use of the digital filter bank, LPC analysis or cepstrum analysis.

A pattern matching section 7 calculates similarities between the derived word feature spectrum and word standard feature spectra registered in the speech word dictionary. The similarity calculation can be used in the collation using the statistical pattern recognition such as the Maharanobi's distance or neural network as well as the multiple similarity method based on feature parameters of fixed orders, for example.

The result of recognition can be obtained by outputting a word having the largest one of the similarities thus obtained with respect to the input speech from a recognition result outputting section 8.

Figure 3:
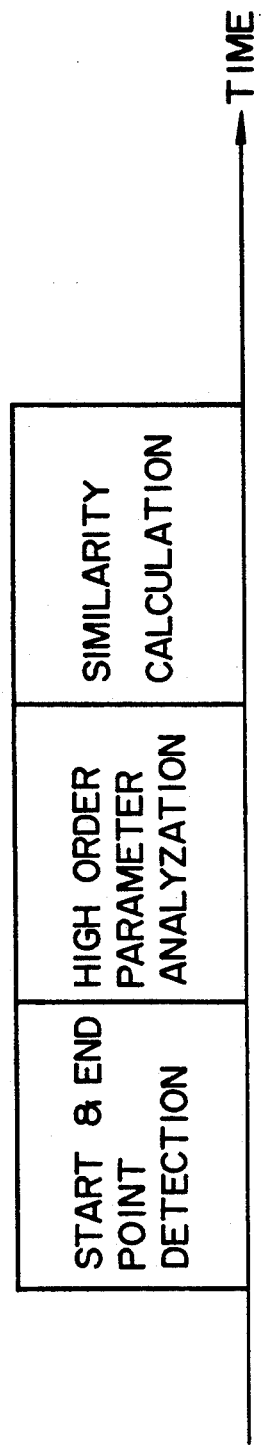
FIG. 3 is a diagram showing the processes effected after the start and end point detection by the speech recognition apparatus of this invention.

As described above, according to this invention, since useless calculations effected for high order parameters can be omitted, the number of entire calculations can be reduced. However, in this invention, since the high-order parameter analyzation is effected after the detection of the start and end points a shown in FIG. 3, slight time delay occurs until the similarity calculation which is the next process is effected. However, the number of sampling points necessary for the pattern collation can be reduced to 10, for example, on the time base is not increased so much and this is particularly effective.

Conventionally, in case of deciding a start point of speech, if the input speech energy level has exceeded a threshold value Eo at time $t_0$ and a preset period of time has elapsed, then the time $t_0$ is detected as the start point. Also, in case of deciding an end of speech, if the speech energy level becomes smaller than the threshold value Eo and kept below the threshold value Eo for a preset period of time $T_Q$, then the time at which the speech energy level has reached the threshold value Eo is detected as the end point as shown in FIG. 4. The method for deciding the end of speech (the end of word boundaries) is disclosed in J. G. Wilpon, L. R. Rabiner, & T. Mortion; "An Improved Word-Detection Algorithm for Telephone-Quality Speech Incorporating Both Syntactic and Semantic Constraints" AT & T Bell Technical T. 63.3, 479(1984).

Figure 5:
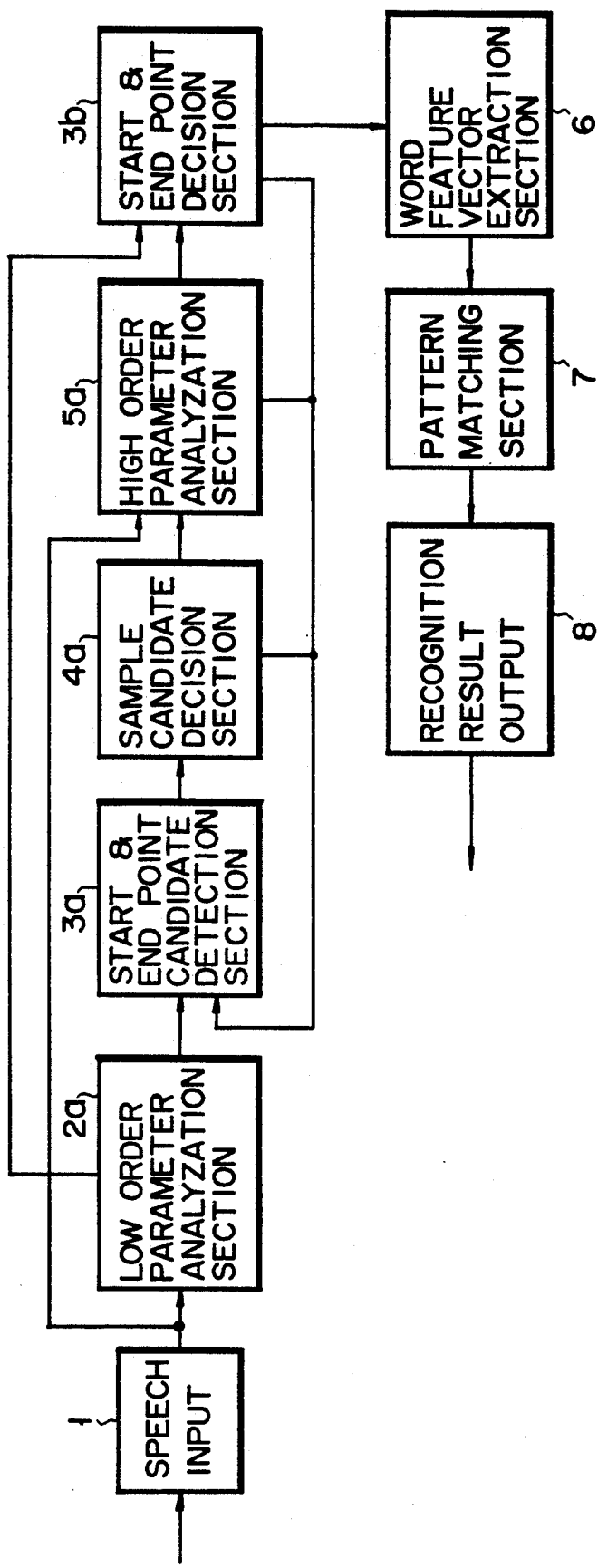
FIG. 5 is a block diagram of a speech recognition apparatus according to another embodiment of the invention.

If, as the conventional method, the end of word boundaries is obtained and then the high-order parameter analyzation is performed, the high-order parameter analyzation is always delayed by a constant time period ($T_Q$). Such embodiment that the delay time is not included in a time period required for obtaining a recognition result is shown in FIG. 5.

In this embodiment, the output terminal of a low-order parameter analyzation section 2a for subjecting a speech output of a speech input section 1 to the low-order parameter analyzation is connected to the first input terminal of a start and end point candidate detection section 3a. The start and end point candidate detection section 3a receives an output signal output from the low-order parameter analyzation section 2a and detects the candidates of the start and end point of word boundaries. The output terminal of the start and end point candidate detection section 3a is connected to the first input terminal of a high-order parameter analyzation section 5a via a sample candidate decision section 4a. The second input terminal of the high-order parameter analyzation section 5a is connected to the output terminal of the speech input section 1. The output terminal of the high-order parameter analyzation section 5a and the second input terminal of the low-order parameter analyzation section 2a are respectively connected to the first and second input terminals of a start and end point decision section 3b. The first output terminal of the start and end point decision section 3b is connected to the input terminal of a word feature vector extraction section 6. The second output terminal of the start and end point decision section 3b is connected to the second input terminals of the start and end point candidate detection section 3a, sample candidate decision section 4a and high-order parameter analyzation section 5a. The word feature vector extraction section 6 is connected to a recognition result output section 8 via a pattern matching section.

Figure 6:
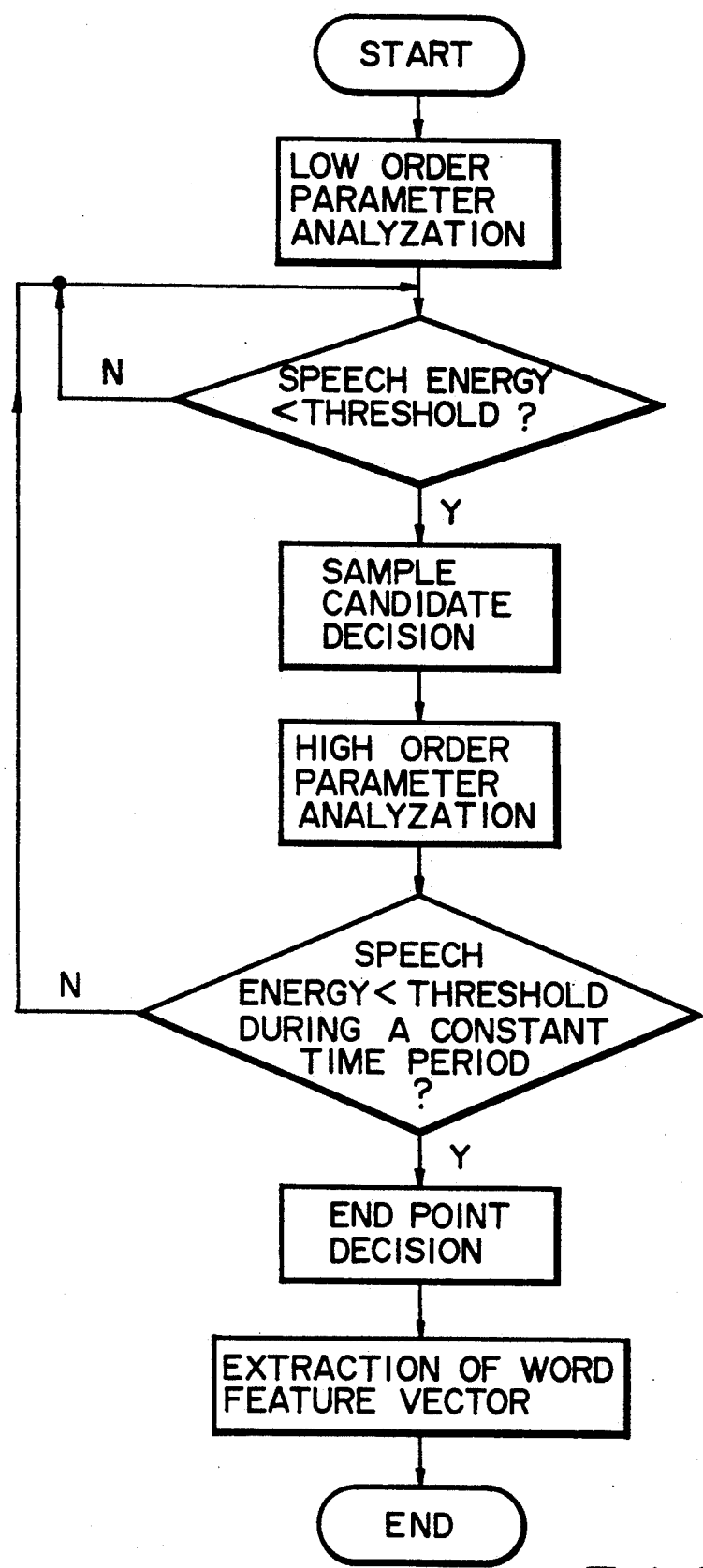
FIG. 6 is a flowchart for explaining the operation of the speech recognition apparatus of FIG. 5.

Next, the operation of the speech recognition apparatus with the above construction is explained with reference to the flow chart of FIG. 6.

Figure 7:
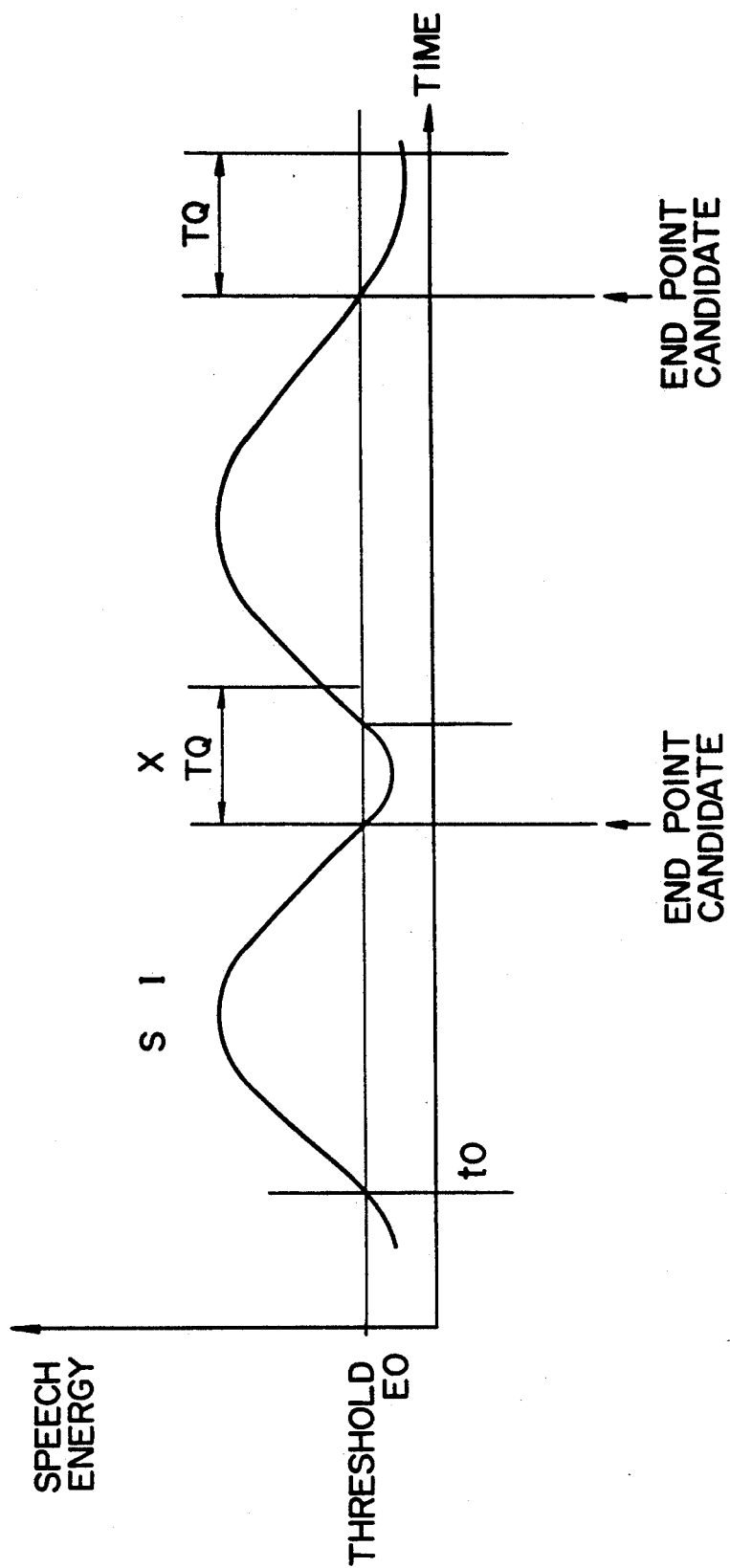
FIG. 7 is a diagram for illustration of examples of detection of start and end point candidates.

For example, if a speech signal corresponding to speech of "six" is input from the speech input section 1 to the low-order parameter analyzation section 2a, the low-order parameter analyzation section 2a subjects the input speech signal to the low-order parameter analyzation. The analyzed speech signal is supplied to the start and end point candidate detection section 3a which in turn detects the candidate of the start point of the speech (six). In the start point candidate detecting operation, if the input speech level has exceeded a threshold value Eo at time $t_0$ and a preset period of time, for example, 0.2 second, has elapsed, then the time $t_0$ is detected as the start point candidate as shown in FIG. 7.

Next, an end point candidate is detected. In the end point candidate detecting operation, if the speech energy becomes smaller than the threshold value Eo and kept below the threshold value Eo for a preset period of time $T_Q$, then the time at which the speech energy has reached the threshold value Eo is detected as the end point candidate as shown in FIG. 7.

When the candidates of the start and end points detected by the start and end point candidate detection section 3a are input to the sample candidate decision section 4a, the sample candidate decision section 4a determines sample points in a range defined by the start and end point candidates. When an output signal of the sample candidate decision section 4a is input to the high-order parameter analyzation section 5a, the high-order parameter analyzation section 5a calculates high order parameters at the decided sample points.

Figure 8:
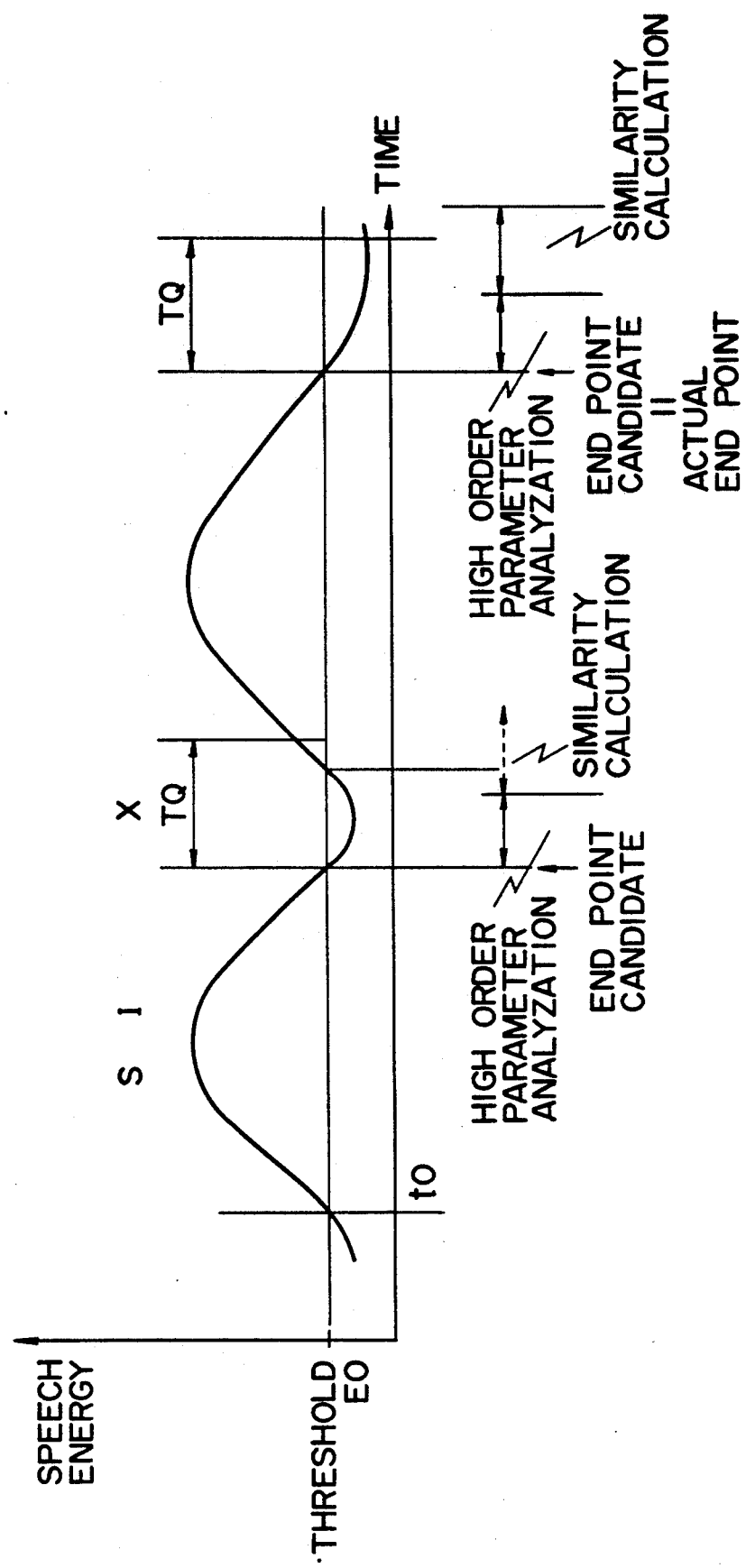
FIG. 8 is a diagram for illustration of examples of detection of start and end points and extraction of speech feature spectrum.

The start and end point decision section 3b receives output signals from the low-order parameter analyzation section 2a and the high-order parameter analyzation section 5a and determines whether the end point candidate is the end point or not. This can be attained by checking whether or not the speech energy after the position of the end point candidate is smaller than the threshold value Eo and is kept below the threshold value for a preset period of time $T_Q$ as shown in FIG. 6. Further, if the speech energy is not kept smaller than the threshold value Eo for a preset period of time $T_Q$ or more after a word "six" is uttered, the start and end point decision section 3b determines that the input end point candidate is not the end point. At this time, the start and end point decision section 3b outputs an output signal to the start and end point candidate detection section 3a and the high-order parameter analyzation section 5a. The high-order parameter analyzation section 5a interrupts calculations for deriving high order parameters, for example, and the start and end point candidate detection section 3a detects the candidates of start and end points again as shown in FIG. 8. After this, sample candidates are decided and the high-order parameter analyzation is effected.

When the start and end point decision section 3b determines that the end point candidate is the end point, the start and end point decision section 3b supplies speech energy in a range of the start and end points to the word feature vector extraction section 6. The word feature vector extraction section 6 extracts word feature vector from the received speech energy. The thus extracted word feature vector is input to the pattern matching section 7 and matched with reference word feature vectors. Similarities derived as the result of collation are supplied to the recognition result output section 8 and the recognition result output section 8 outputs the result of recognition.

According to the former embodiment, time delay of a preset period of time $T_Q$ always occurs in the start and end point detection operation, but according to the embodiment of FIG. 5, preset delay time required for detection of the end point of the word is not included in a period of time required for deriving the recognition result so that the recognition process can be effected at a higher speed while the recognition efficiency is kept.

In this invention, since all of the high order parameters are not derived on the real time basis, a special hardware for effecting the high-order parameter analyzation such as DSP at a high speed is not necessary. Therefore, the speech recognition can be effected with the computation ability of a small-capacity computer such as a personal computer.

Further, in a case where a computer system which has a large computation ability like a high-speed work station, in which an operating system is installed and with which the high order parameter can be processed on the real time basis only by use of software is used, the low-order parameter analyzation and the high-order parameter analyzation can be simultaneously effected in parallel by use of a multitask process. In this case, since useless high order parameters are not calculated in this invention, another task can be effected and the operation efficiency for the speech recognition can be improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A speech recognition apparatus comprising:
   low-order parameter analyzation means for analyzing input speech and deriving a low-order parameter time series of the input speech;
   start and end point detection means for detecting start and end points of the input speech from the parameter time series derived by said low-order parameter analyzation means;
   high-order parameter analyzation means for analyzing the input speech and intermittently deriving high order parameters at preset time intervals along a time axis within a range of the input speech, extending from the start point to the end point after the start and end points are detected by said start and end point detection means; and
   pattern matching means for matching feature parameters corresponding to the high order parameters derived by said high-order parameter analyzation means with reference parameters previously registered to recognize the input speech according to a result of a collation process.

2. A speech recognition apparatus according to claim 1, wherein said low-order parameter analyzation means analyzes the input speech by a number of arithmetic operations smaller than performed by said high-order parameter analyzation means.

3. A speech recognition apparatus according to claim 2, wherein the result of analyzation includes speech power and zero cross number.

4. A speech recognition apparatus according to claim 1, wherein said high-order parameter analyzation means analyzes the input speech by a number of arithmetic operations larger than performed by said low-order parameter analyzation means.

5. A speech recognition apparatus according to claim 4, wherein the result of said analyzation contains a Discrete Fourier Transform (DFT) spectrum, a filter bank analyzation or a Linear Predictor Coefficient (LPC) parameter.

6. A speech recognition apparatus according to claim 1, wherein said low-order parameter analyzation means derives low order parameters having speech energy from the input speech signal in a preset range of analyzation window length for each preset analyzation frame period shorter than the analyzation window length and outputs a low order parameter corresponding to the analyzation frame to said start and end point detection means.

7. A speech recognition apparatus according to claim 6, wherein said low-order parameter analyzation means derives low order parameters from the input speech signal in a range of the analyzation window length of 24 milliseconds for each analyzation frame period of 8 milliseconds.

8. A speech recognition apparatus according to claim 6, wherein said start and end point detection means includes means for setting a threshold value for the speech energy of the low order parameters and determines a time at which the speech energy of the analyzation frame has exceeded the threshold vale as a starting point of a word and the time at which the speech energy of the low order parameters corresponding to the analyzation frame becomes smaller than the threshold value as an end point of the word.

9. A speech recognition apparatus according to claim 1, which further comprises a sample frame determination section for determining the frame for analyzing the high order parameters according to the start and end points of said start and end point detection means and in which said high-order parameter analyzation mean derives high order parameters including filter analyzation output, DFT spectrum, cepstrum or LPC parameter from the speech signal in a range of the sample frame determined by said sample frame determination section.

10. A speech recognition apparatus according to claim 1, which further comprises means for calculating word feature parameters from the high order parameters and outputting word feature parameter to said pattern matching means as the feature pattern.

11. A speech recognition method according to claim 1, wherein said high-order parameter analyzation means derives said high order parameters at equal intervals.

12. A speech recognition apparatus according to claim 1, wherein said high-order parameter analyzation means includes means for intermittently deriving the high order parameters at equal time intervals.

13. A speech recognition apparatus comprising:
   low-order parameter analyzation means for deriving a low-order parameter time series from input speech and outputting speech energy;
   start and end point candidate detection means for detecting the candidates of the start and end points of the input speech according to the relation between the level of the speech energy output from said low-order parameter analyzation means and a threshold value;
   high-order parameter analyzation means for analyzing said input speech and intermittently deriving high order parameters at preset time intervals along a time axis within a range of the input speech between the candidates of the start and end point detected by said start and end point candidate detection means, on the basis of the speech energy output from said low-order parameter analyzation means;
   start and end point decision means for checking the relation between the speech energy level and the threshold value and determining the candidates of the start and end points as the start and end points; and
   identifying means for identifying the input speech based on the parameters derived by said high-order parameter analyzation means in response to the determining of the start and end points.

14. A speech recognition apparatus according to claim 13, wherein said start and end point decision means decides the end point candidate as the end point when detecting that the speech energy level is kept larger than the threshold value for a preset period of time.

15. A speech recognition apparatus according to claim 13 wherein said start and end point decision means includes means for interrupting the analyzation effected by said high-order parameter analyzation means when detecting that a period in which the speech energy level is kept larger than the threshold value is shorter than a preset period of time and operating said start and end point candidate detection means again.

16. A speech recognition apparatus according to claim 13, wherein said high-order parameter analyzation means includes means for intermittently deriving the high order parameters at equal time intervals.

17. A speech recognition method comprising the steps of:
 a) analyzing input speech by a predetermined number of arithmetic operations and deriving a low-order parameter time series of the input speech by using a personal computer;
 b) detecting start and end points of the input speech from the parameter time series derived by said low-order parameter analyzation;
 c) analyzing said input speech by a number of arithmetic operations larger than the predetermined number of arithmetic operations for deriving the low-order parameter time series, to intermittently derive high order parameters at preset time intervals along a time axis within a range of the input speech, extending from the start point to the end point by using said personal computer after the start and end points are detected; and
 d) matching feature parameters corresponding to the high order parameters derived by said high-order parameter analyzation with reference parameters previously registered in said personal computer so as to enable recognition of the input speech according to a result of a collation process.

18. A speech recognition method according to claim 17, wherein step a) includes deriving low order parameters having speech energy from the input speech in a preset range of analyzation window length for each preset analyzation frame period shorter than the analyzation window length and outputting a low order parameter corresponding to an analyzation frame.

19. A speech recognition method according to claim 18, wherein step a) includes deriving low order parameters having speech energy from the input speech in a preset range of analyzation window length for each preset analyzation frame period shorter than the analyzation window length and outputs a low order parameter corresponding to an analyzation frame.

20. A speech recognition method according to claim 18, wherein step b) includes setting a threshold value for the speech energy of the low order parameters and determining a time at which the speech energy of the analyzation frame has exceeded the threshold value as a starting point of a word, and a time at which the speech energy of the low order parameters corresponding to the analyzation frame becomes smaller than the threshold value as an end point of the word.

21. A speech recognition apparatus according to claim 17, wherein step c) includes intermittently deriving the high order parameters at equal time intervals.

22. A speech recognition method comprising the steps of:
 a) analyzing input speech by a predetermined number of arithmetic operations for deriving a low-order parameter time series from the input speech and outputting low-order speech energy by using a personal computer;
 b) detecting candidates of start and end points of the input speech according to a relation between a level of the low-order speech energy and a threshold value;
 c) analyzing the input speech by a number of arithmetic operations larger than the predetermined number of arithmetic operations for deriving the low-order time series, to intermittently derive high order parameters at preset time intervals along a time axis within a range of the input speech between the detected candidates of the start and end points by using said personal computer;
 d) checking the relation between the speech energy level and the threshold value and determining the start and end point candidates as the start and end points; and
 e) identifying the input speech based on the parameters derived by step c) in response to the determination of the start and end points.

23. A speech recognition apparatus according to claim 22, wherein step c) includes intermittently deriving the high order parameters at equal time intervals.

* * * * *